United States Patent [19]
Wood et al.

[11] 3,856,875
[45] Dec. 24, 1974

[54] PROCESS FOR PRODUCING 1,1,3,4,4,6-HEXAMETHYL-1,2,3,4-TETRAHYDRONAPTHALENE (HMT)

[75] Inventors: Thomas F. Wood, Wayne; Emanuel Heilweil, Fairfield, both of N.J.

[73] Assignee: Givaudan Corporation, Clifton, N.J.

[22] Filed: Dec. 5, 1973

[21] Appl. No.: 422,035

[52] U.S. Cl. ............................... 260/668 F, 260/592
[51] Int. Cl. ............................................. C07c 15/20
[58] Field of Search ................................ 260/668 F

[56] References Cited
UNITED STATES PATENTS
3,278,621  10/1966  Stofberg et al. ................. 260/668 F Primary Examiner—C. Davis
Attorney, Agent, or Firm—Thomas Cifelli, Jr.

[57] ABSTRACT

A process for the preparation of 1,1,3,4,4,6-hexamethyl-1,2,3,4-tetrahydronaphthalene wherein equivalent or excess amounts of p-cymene are reacted with a substantially equimolar solution of neohexene (3,3-dimethyl-1-butene) and a t-alkyl halide in the presence of an effective amount of an anhydrous aluminum halide catalyst suspended in a reaction compatible solvent.

24 Claims, No Drawings

PROCESS FOR PRODUCING 1,1,3,4,4,6-HEXAMETHYL-1,2,3,4-TETRAHYDRONAPTHALENE (HMT)

BACKGROUND OF THE INVENTION

1. Field of the Invention

This invention relates to a process for preparing 1,1,-3,4,4,6-hexamethyl-1,2,3,4-tetrahydronaphthalene, hereinafter sometimes referred to as "HMT", and, more particularly, to the preparation of HMT by the reaction of p-cymene with a substantially equimolar solution of neohexene and a t-alkyl halide in the presence of an anhydrous aluminum halide catalyst suspended in a reaction compatible solvent.

2. The Prior Art 1,1,3,4,4,6-hexamethyl-1,2,3,4-tetrahydronaphthalene (HMT) is a compound which, upon acetylation, yields 7-acetyl-1,1,3,4,4,6-hexamethyl-1,2,3,4-tetrahydronaphthalene (Acetyl HMT), a product well known as "Tonalid" or "Veritone" which is valuable in the art of perfumery because of its musk-like odor properties.

Heretofore, processes for the preparation of HMT and Acetyl HMT using neohexene in the production thereof have been known but have not been commercially feasible because of the unavailability of the requisite raw materials. There is disclosed in Swiss Pat. No. 336,377, subclaims 11 and 12, a process where p-cymene is reacted with neohexene in the presence of sulfuric acid or aluminum halide to produce a compound which, upon acetylation, yields a product designated in the Swiss Patent as 6-acetyl-1,1,2,2,3,3,4-heptamethylindan. According to T. F. Wood et al., J. Org. Chem., 28, 2248 (1963), this designation was later discovered to be erroneous, the product instead being found to be 7-acetyl-1,1,3,4,4,6-hexamethyl-1,2,3,4-tetrahydronapthalene (Acetyl HMT).

U.S. Pat. No. 3,246,044 discloses a simple, convenient process for the production of HMT and Acetyl HMT utilizing as reactants α,p-dimethylstyrene and neohexene (t-butylethylene). However, the α,p-dimethylstyrene required in the process of U.S. Pat. No. 3,246,044, previously in good supply as a by-product of the p-cresol ex p-cymene process, is now only available in limited supply and is likely to become even scarcer in the future.

The synthesis of HMT and Acetyl HMT via the p-cymyl cation derived directly from α,p-dimethylstyrene as disclosed in U.S. Pat. No. 2,851,501, example II and U.S. Pat. No. 3,379,784, is a convenient and straightforward method of synthesis but has in the past suffered the disadvantage of requiring commercially unavailable 2,3-dimethylbutene in the process. Neohexene, until recently, has been unavailable commercially and costly to prepare. However, neohexene is now available (Phillips Petroleum Co.), but it remains relatively high in price. Thus, it would be of great practical advantage to have a process starting from p-cymene, instead of α,p-dimethylstyrene which would give higher yields of HMT based on neohexene. Our novel process has such an advantage.

SUMMARY OF THE INVENTION

According to the present invention, there is provided an improved method for the preparation of 1,1,3,4,4,6-hexamethyl-1,2,3,4-tetrahydronaphthalene (HMT) which comprises reacting p-cymene in equivalent or excess amounts with a substantially equimolar solution of neohexene (3,3-dimethyl-1-butene) and a t-alkyl halide in the presence of an effective amount of an anhydrous aluminum halide catalyst suspended in a reaction compatible solvent.

By the improved process of the present invention, yields of HMT in excess of 130 percent by weight based upon the amount of neohexene used in the process are obtained and even yields of HMT as high as 165 percent by weight of neohexene can be obtained.

DETAILED DESCRIPTION OF THE INVENTION

We have discovered that 1,1,3,4,4,6-hexamethyl-1,2,3,4-tetrahydronaphthalene (HMT) can be obtained in high yield using readily available starting materials, p-cymene, t-butyl chloride and neohexene (3,3-dimethyl-1-butene), by a simple, convenient, one-step reaction illustrated by the following equation:

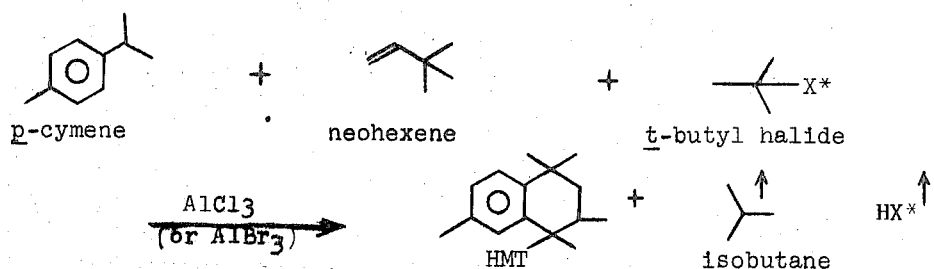

cymene is reacted with neohexene in the presence of

The results obtained in accordance with the process of the present invention would not be predictable from prior art teachings. For example, S. H. Weber, D. B. Spoelstra, and E. H. Polak, Rec. Trav. Chim., 74, 1179 (1955) in their paper entitled, t-Amylated p-Cymene, report in the abstract that the interaction of p-cymene and "tert-amyl chloride in the presence of aluminum chloride according to the Friedel-Crafts method" produces a "polymethylindan mixture consisting of 41 percent of 1,1,2,3,3,5-hexamethylindan, 23 percent of 3-ethyl-1,1,3,5-tetramethylindan and 12 percent of 1,1,3,3,5-pentamethylindan." From this teaching, it would be expected that when t-butyl chloride is reacted with p-cymene in the presence of aluminum chloride catalyst, a considerable amount of 1,1,3,3,5-pentamethylindan will be formed. But to the contrary, when t-butyl chloride is reacted with p-cymene in the presence of aluminum chloride in the manner illustrated by the above equation under conditions according to the improved process of the present invention, the presence of the expected 1,1,3,3,5-pentamethylindan is hardly detectable in the crude product while the desired HMT is obtained in yields approaching 165 percent by weight based upon the amount of neohexene used in the reaction.

The process of the present invention, as noted earlier, relies upon the well-known Friedel-Crafts method which, in turn, requires the use of any one or more of many well-known Friedel-Crafts solvents. In producing high yields of HMT in accordance with the present invention, excellent results are obtained when substantially equimolar amounts of neohexene and a t-alkyl halide are dissolved in ethylene dichloride or methylene dichloride while the use of such other commonly used Friedel-Crafts solvents as carbon tetrachloride, carbon disulfide and nitrobenzene yield substantially poorer results. Although this peculiar "solvent effect" appears to be present upon investigation of the many Friedel-Crafts solvents that might be employed in the processes of the present invention, there is, as yet, no theoretical ground upon which we can explain this phenomenon.

Notwithstanding the lack of a theoretical explanation for this solvent dependency, it is possible, by extensive trial investigation, to determine which solvents among many are compatible with the reactants used in the process of the present invention and those which are not. In general, those solvents which produce yields of HMT in excess of about 130 percent by weight based upon the amount of neohexene are deemed to be satisfactory solvents while those which produce yields of HMT of less than about 120 percent by weight based upon the amount of neohexene are deemed to be unsatisfactory. In fact, some solvents are considered to be detrimental to the production of HMT by the process of the present invention as the yields of HMT obtained are 100% or less based on the weight of neohexene and in many instances the detrimental solvents used in the process of the present invention cause a reduction in the yield of HMT to 65 percent or less by weight based upon the amount of neohexene used. From our own investigations, Table I below sets forth those solvents that were found to be satisfactory and those which were found to be unsatisfactory.

TABLE 1

SOLVENT DEPENDENCY IN PRODUCTION OF HMT

| SATISFACTORY SOLVENTS | UNSATISFACTORY SOLVENTS |
|---|---|
| Ethylene dichloride | 1,2,2-Trichloroethylene |
| Chloroform | 1,1,2,2-Tetrachloroethylene |
| Methylene Dichloride | Carbon Tetrachloride |
| 1,1,2,2-Tetrachloroethane | 1,1,1-Trichloroethane |
| 1,2-Dichloroethylene (cis-trans) | Carbon Disulfide |
| 1,2,3-Trichloropropane | 1,1,2,2,2-Pentachloroethane |
| 1,1,2-Trichloroethane | 1,2-Dichloropropane |
| Monochlorobenzene | 1,1-Dichloroethylene |
| Fluorobenzene | 1,1-Dichloroethane |
| Orthodichlorobenzene | Nitromethane |
| p-Xylene | Benzene |
|  | Nitrobenzene |
|  | p-Cymene |
|  | n-Hexane |

The only partial pattern that can be gleaned from the above tabulated listing is that among the chlorinated solvents listed in both the satisfactory column and the unsatisfactory column and which contain 1, 2, or 3 carbon atoms, the satisfactory solvents have both chlorine and hydrogen atoms attached to each carbon atom while the unsatisfactory solvents do not.

PREFERRED EMBODIMENTS

The process of the present invention can be carried out by the addition of a cold solution containing a t-alkyl halide such as t-butyl chloride, neohexene and p-cymene dropwise into a well agitated and cooled suspension of an aluminum halide, such as $AlCl_3$ or $AlBr_3$, in a suitable solvent, such as ethylene dichloride. Evolution of isobutane mixed with hydrogen halide (HCl or HBr) is observed during the course of the reaction.

More specifically, it is preferred to feed a solution of neohexene and a t-alkyl halide, in nearly equimolar amounts, and p-cymene in about 120 percent molar excess, per mole of neohexene, into a cold, e.g., −10° to 0°C., well stirred mixture of aluminum halide catalyst, e.g. $AlCl_3$ or $AlBr_3$, suspended in about 10 to 20 times its weight of a suitable solvent, e.g., ethylene dichloride or methylene dichloride. The addition of the reactants is completed over a period ranging from about 1 to about 2 hours and then the reaction mixture is continuously stirred for an additional period of from about 1 to about 3 hours. The reaction mixture is then quenched on crushed ice and further processed in the usual manner for Friedel-Crafts reactions to extract the desired HMT product.

In general, the proportions of the reactions used can be varied over a wide range, but it is preferred to use a mixture of p-cymene, t-alkyl halide and neohexene wherein the latter two components are present in nearly equimolar amounts and the p-cymene is present in an excess molar amount, e.g. of from about 1.2 to about 3.0 moles of p-cymene to each mole of neohexene and t-alkyl halide.

Any t-alkyl halide can be used in the process of the present invention, but t-butyl chloride, t-amyl chloride or 2,5-dichloro-2,5-dimethylhexane are preferred.

The preferred Friedel-Crafts aluminum halide catalysts are aluminum chloride and aluminum bromide but, for practical reasons of supply and cost, aluminum chloride is most preferred. As with the reactants, the amount of the Friedel-Crafts aluminum halide catalyst used can be similarly varied over a wide range but it is preferred to use from about 2 percent to about 10 percent by weight of the aluminum halide catalyst based upon the combined weight of the reactants. While greater or smaller amounts of aluminum halide catalyst can be used, amounts much in excess of about 10 percent by weight based upon the combined weight of the reactants produce no noticeable advantage and thus constitute a waste of catalyst. Amounts of aluminum halide catalyst much smaller than about 2 percent by weight based upon the combined weight of the reactants cause the reaction to proceed at an undesirably slower rate.

The reaction is ideally conducted at temperatures below ambient room temperature, preferably at temperatures ranging from about −10°C. to about 10°C. and most preferably at temperatures ranging from about −10°C. to about 5°C. If the reaction is conducted at temperatures much below about −10°C., the reaction proceeds undesirably slowly while reactions conducted at temperatures much in excess of about 10°C. results in the excess production of undesirable by-products with less production of the desired HMT product.

The following Examples will serve to further illustrate the process of the present invention in a few of its specific, preferred embodiments.

EXAMPLE I 1,1,3,4,4,6-Hexamethyl-1,2,3,4-Tetrahydronaphthalene

A suspension of 10 grams of anhydrous $AlCl_3$ granules in 100 grams of ethylene dichloride was charged into a 2-liter, 3-necked reaction flask, provided with a thermometer, stirrer, reflux condenser and dropping funnel, and cooled to −8°C. with stirring.

To the AlCl$_3$ suspension in ethylene dichloride, a solution of 304 grams of p-cymene (2.26 moles), 104.5 grams of t-butyl chloride 1.13 moles) and 84 grams of neohexene (1.0 mole) was added dropwise over a 2-hour period with stirring and cooling to maintain the reaction temperature at approximately −8°C. to −4°C. During the feeding of the reactants to the AlCl$_3$ suspended in ethylene dichloride there was a steady evolution of hydrogen chloride and isobutane gases and the reaction was observed to be only mildly exothermic. Stirring of the reactants was continued at −6°C. to −2°C. for an additional three hours after completion of feeding of the reactants during which 3-hour period there was observed continued evolution of hydrogen chloride gas.

The reaction product was then quenched into a well-stirred mixture of 200 grams of cracked ice and 200 grams of ice-water. After allowing the mixture to settle and come to ambient room temperature, the lower aqueous layer was removed and discarded. The remaining oil layer was washed successively with 200 ml. of 5 percent aqueous hydrochloric acid, 200 ml. of 10 percent aqueous sodium carbonate solution and finally with 200 ml. of water. The resultant product was then distilled, first at atmospheric pressure to remove most of the ethylene dichloride solvent, then at reduced pressures. After recovery of the excess p-cymene remaining in the reaction product, the desired 1,1,3,4,4,6-hexamethyl-1,2,3,4-tetrahydronaphthalene (HMT) was obtained as a colorless fraction, b.p. 80° to 90°C. at 1mm. pressure, which rapidly solidified with the evolution of heat (congealing point, 58.4°C).

Vapor phase chromatographic analysis (v.p.c.) of the solid distillate using a 20 M. columnn at 175°C. revealed an HMT purity of 95 percent. The yield was 137 grams HMT or 163 percent by weight based upon the weight of neohexene used in the reaction.

The 137 gram fraction of product was then crystallized from an equal weight of isopropyl alcohol to yield a pure hydrocarbon, m.p. 66°–67°C. which was shown to be identical with the product made by the known procedure set forth in Example I of U.S. Pat. No. 3,246,044.

Acetylation of the pure hydrocarbon obtained from the above procedure by the procedure described in Example II of U.S. Pat. No. 3,246,044 produced the same acetyl derivative (Acetyl HMT) as was demonstrated by mixed melting point and spectral comparisons.

The acetylated product exhibited the same strong, musk-like odor of Acetyl HMT produced by prior known methods making it ideally suitable and useful in the art of perfumery.

EXAMPLES II THROUGH XXIV

Solvent Effect on Yield of HMT

The procedures of Example I were successively repeated using various solvents in an amount equal to the weight of ethylene dichloride used therein in order to determine the solvent dependency of the process of the present invention. In Table 2, below are listed the yields of HMT obtained with satisfactory solvents and in Table 3, below are listed the yields of HMT obtained with unsatisfactory solvents. In each instance, the percentage yield of HMT is expressed as a percentage based upon the weight of neohexene used in the reaction. The only variable in the procedure of Example I was the particular solvent used except that Example II in Table 2 represents a repeat run of Example I using ethylene dichloride as the solvent to substantiate a second time the results obtained in Example I.

TABLE 2

EFFECT OF SATISFACTORY SOLVENTS ON YIELD OF HMT

| EXAMPLE | SOLVENT | YIELD OF HMT % |
|---------|---------|----------------|
| II | ethylene dichloride (1,2-dichloroethane) | 161.3 |
| III | methylene dichloride 1,1-dichloromethane) | 165.0 |
| IV | 1,2-dichloroethylene (cis-trans) | 162.0 |
| V | 1,1,2,2-tetrachloroethane | 159.5 |
| VI | chloroform (1,1,1-trichloromethane) | 152.2 |
| VII | 1,1,2-trichloroethane | 148.3 |
| VIII | 1,2,3-trichloropropane | 134.5 |
| IX | monochlorobenzene | 154.2 |
| X | fluorobenzene | 149.2 |
| XI | o-dichlorobenzene | 141.3 |
| XII | p-xylene | 137.5 |

TABLE 3

EFFECT OF UNSATISFACTORY SOLVENTS ON YIELD OF HMT

| EXAMPLE | SOLVENTS | YIELD OF HMT % |
|---------|----------|----------------|
| XIII | propylene dichloride (1,2-dichloropropane) | 100 |
| XIV | 1,2,2-trichloroethylene | 65.3 |
| XV | 1,1,2,2-tetrachloroethylene | 63.1 |
| XVI | carbon tetrachloride | 60.1 |
| XVII | 1,1,1-trichloroethane | 60.0 |
| XVIII | 1,1,2,2,2-pentachloroethane | 59.0 |
| XIX | 1,1-dichloroethylene | 38.7 |
| XX | 1,1-dichloroethane | 96.4 |
| XXI | benzene | 99.5 |
| XXII | carbon disulfide | 54.3 |
| XXIII | nitrobenzene | 36.2 |
| XXIV | p-cymene | 75.9 |
| XXV | n-hexane | 33.3 |
| XXVI | nitromethane | 21.4 |

EXAMPLE XXVII

The procedure of Example I was again repeated except that 104 g. of 2,5-dichloro-2,5-dimethylhexane (0.565 moles) was substituted for the 104.5 g. (1.13 moles) of t-butylchloride. In this instance, the exit gas was solely hydrogen chloride since the by-product, 2,5-dimethylhexane is a liquid which boils slightly over 100° at atmospheric pressure. By this modification there was obtained 137 g. of the desired 1,1,3,4,4,6-hexamethyl-1,2,3,4-tetrahydronaphthalene (HMT) in a fraction boiling at 78°–100° at 1 mm. Purity of this material was shown to be 95 percent by vapor phase chromatography. The yield of distilled product (HMT) was 163 percent by weight based on neohexene.

EXAMPLE XXVIII

When the procedure of Example I was repeated substituting an equivalent amount of AlBr$_3$ catalyst for the AlCl$_3$ catalyst, there was obtained HMT in a yield of 143.7 percent by weight based on neohexene.

EXAMPLE XXIX

The procedure of Example I was again repeated substituting an equivalent amount of t-amyl chloride (1.13 moles) for t-butyl chloride. The yield of HMT was 147.6 percent by weight based on neohexene.

EXAMPLE XXX

The procedure of Example I was again repeated substituting an equivalent amount of t-butyl bromide (1.13 moles) for t-butyl chloride with substantially the same results.

From all of the foregoing description and specific examples, it is evident that the process of the present invention produces substantially equivalent yields of 1,1,-3,4,4,6-hexamethyl-1,2,3,4-tetrahydronaphthalene (HMT) from a reaction between p-cymene and neohexene compared to those previously obtained using α,p-dimethylstyrene and neohexene (U.S. Pat. No. 3,246,044). Since α,p-dimethylstyrene must be prepared from p-cymene, it is evident that the present invention offers a practical, economic advantage by enabling the passage directly from p-cymene to HMT in a single reaction. It is to be understood, however, that many changes, variations, and substitutions can be made in practicing the process of the present invention without departing from the scope and spirit thereof as defined in the following claims.

What is claimed is:

1. A process for the preparation of 1,1,3,4,4,6-hexamethyl-1,2,3,4-tetrahydronaphthalene which comprises reacting p-cymene in equivalent or excess amounts with a substantially equimolar solution of neohexene and t-alkyl halide in the presence of an effective amount of an anhydrous aluminum halide catalyst suspended in a reaction compatible solvent.

2. The process of claim 1, wherein the t-alkyl halide is t-butyl chloride.

3. The process of claim 1, wherein the t-alkyl halide is t-amyl chloride.

4. The process of claim 1, wherein the t-alkyl halide is t-butyl bromide.

5. The process of claim 1, wherein the t-alkyl halide is 2,5-dichloro-2,5-dimethylhexane.

6. The process of claim 1, wherein the reaction compatible solvent is selected from a group consisting of: ethylene dichloride; chloroform; methylene dichloride; 1,1,2,2-tetrachloroethane; 1,2-dichloroethylene (cis-trans); 1,2,3-trichloropropane; 1,1,2-trichloroethane; monochlorobenzene; fluorobenzene; orthodichlorobenzene; and p-xylene.

7. The process of claim 1, wherein the reaction compatible solvent is ethylene dichloride.

8. The process of claim 1, wherein the reaction compatible solvent is methylene dichloride.

9. The process of claim 1, wherein the reaction compatible solvent is 1,1,2,2-dichloroethane.

10. The process of claim 1, wherein the reaction compatible solvent is 1,2-dichloroethylene.

11. The process of claim 1, wherein the reaction compatible solvent is chloroform.

12. The process of claim 1, wherein the reaction compatible solvent is monochlorobenzene.

13. The process of claim 1, wherein the reaction compatible solvent is 1,2,3-trichlorpropane.

14. The process of claim 1, wherein the reaction compatible solvent is 1,1,2-trichloroethane.

15. The process of claim 1, wherein the reaction compatible solvent is orthodichlorobenzene.

16. The process of claim 1, wherein the reaction compatible solvent is fluorobenzene.

17. The process of claim 1, wherein the reaction compatible solvent is p-xylene.

18. The process of claim 1, wherein the catalyst is anhydrous aluminum chloride.

19. The process of claim 1, wherein the catalyst is anhydrous aluminum bromide.

20. The process of claim 1, wherein the p-cymene is present in the reaction in an amount ranging from about 1.2 moles to about 3.0 moles for each mole of neohexene and t-alkyl halide.

21. The process of claim 1, wherein the anhydrous aluminum halide is present in the reaction in an amount ranging from about 2 percent to about 10 percent by weight based upon the combined weight of the reactants.

22. The process of claim 1, wherein the reaction temperature is maintained within a range of from about −10°C. to about 10°C.

23. The process of claim 1, wherein the reaction temperature is maintained within a range of from about −10°C. to about 5°C.

24. The process of claim 1, wherein the reaction compatible solvent is present in the reaction in an amount by weight ranging from about 10 to about 20 times the weight of the anhydrous aluminum halide catalyst.

* * * * *

UNITED STATES PATENT OFFICE
CERTIFICATE OF CORRECTION

Patent No. 3,856,875            Dated December 24, 1974

Inventor(s) Thomas F. Wood et al.

It is certified that error appears in the above-identified patent and that said Letters Patent are hereby corrected as shown below:

Column 8, line 6, "dichloroethane" should read

-- tetrachloroethane --.

Column 8, line 14, "trichlorpropane" should read

-- trichloropropane --.

Signed and Sealed this seventh Day of October 1975

[SEAL]

Attest:

RUTH C. MASON
*Attesting Officer*

C. MARSHALL DANN
*Commissioner of Patents and Trademarks*